(No Model.)

S. A MERRILL.
CULINARY FORK.

No. 448,155.

Patented Mar. 10, 1891.

UNITED STATES PATENT OFFICE.

STEPHEN A. MERRILL, OF CAMBRIDGE, ASSIGNOR OF ONE-HALF TO ARTHUR S. LOCKE, OF LOWELL, MASSACHUSETTS.

CULINARY FORK.

SPECIFICATION forming part of Letters Patent No. 448,155, dated March 10, 1891.

Application filed December 1, 1890. Serial No. 373,121. (No model.)

*To all whom it may concern:*

Be it known that I, STEPHEN A. MERRILL, of Cambridge, in the county of Middlesex, State of Massachusetts, have invented certain new and useful Improvements in Culinary Forks, of which the following is a description sufficiently full, clear, and exact to enable any person skilled in the art or science to which said invention appertains to make and use the same, reference being had to the accompanying drawings, forming part of this specification, in which—

Figure 1:
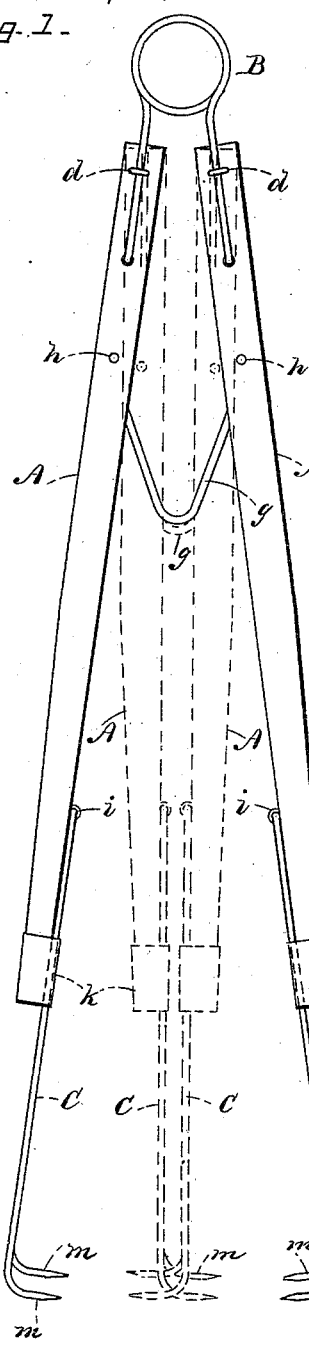
Figure 2:
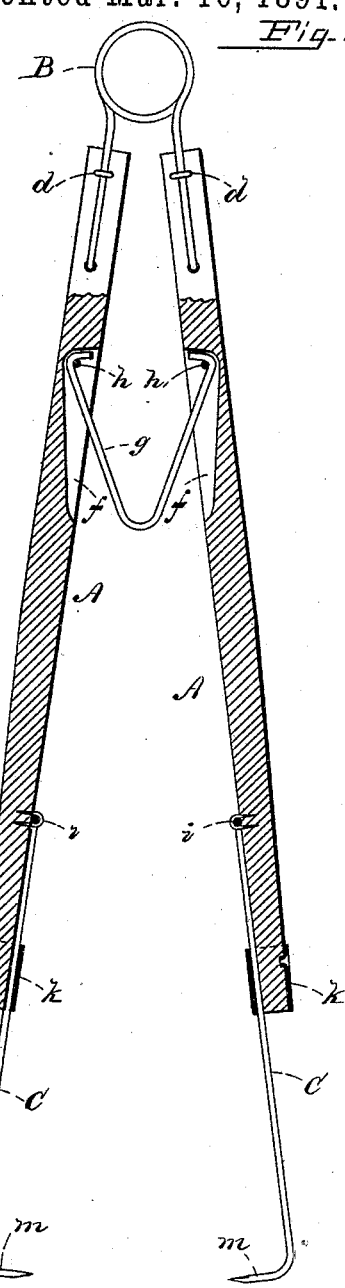

Figure 1 is an elevation of my improved fork; Fig. 2, a longitudinal section of the same, and Fig. 3 a sectional elevation illustrating certain details of construction.

Like letters of reference indicate corresponding parts in the different figures of the drawings.

My invention relates to forks which are especially adapted for use in handling cooking food; and it consists in certain novel features hereinafter fully set forth and claimed, the object being to produce a simpler, cheaper, and more effective device of this character than is now in ordinary use.

The nature and operation of the improvement will be readily understood by all conversant with such matters from the following explanation.

In the drawings, A A represent the fork-handles, which are constructed of wood and are secured together at one end by a single coil-spring B. The ends of said spring are respectively bent and passed through the handles at $b$, and are secured thereto by staples $d$. The spring B acts torsionally to spread the opposite ends of the handles A apart. Said handles are chambered in their inner edges at $f$, and a V-spring $g$ is secured in said chambers by rivets $h$, the purpose of said spring being to prevent lateral movement of the handles when in use.

Figure 3:
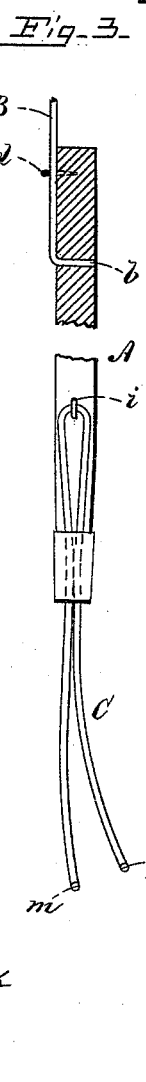

The tines C consist of a rod of wire bent or looped upon itself and secured to the inner faces of the handles A by staples $i$. Ferrules $k$ are passed over said tines and secure them to the handle end. The tines are bent or curved laterally out of line with the handles A, as best shown in Fig. 3, and the ends $m$ of the wire are bent inward at right angles and pointed, as shown in Fig. 1. The tines thus arranged overlap when the handles are brought together, as shown by dotted lines in Fig. 1.

In use the non-heat-conducting handles A are grasped and the fork readily inserted in the cooking food, the tines being forced therein by compressing the handles against the force of the spring B, penetrating the food, which may be lifted thereby in a manner readily understood without a more explicit description. The V-spring prevents lateral movement of the handles and the tines from being forced past each other or accidentally detached from the food.

Having thus explained my invention, what I claim is—

In a culinary fork, the handles A, chambered at $f$, in combination with the torsion-spring B, the stiffening-spring $g$, secured in said chambers, and the hook-shaped laterally-curved tines C, secured to said handles, substantially as described.

STEPHEN A. MERRILL.

Witnesses:
L. M. HANNUM,
M. C. BOWERS.